United States Patent
Skaarup Jensen et al.

(10) Patent No.: US 6,902,393 B2
(45) Date of Patent: Jun. 7, 2005

(54) PLANT FOR MANUFACTURING CEMENT CLINKER

(75) Inventors: Lars Skaarup Jensen, Vallensbaek (DK); Kent Thomsen, Roskilde (DK)

(73) Assignee: F.L. Smidth A/S, Valby (DK)

( * ) Notice: Subject to any disclaimer, the term of this patent is extended or adjusted under 35 U.S.C. 154(b) by 100 days.

(21) Appl. No.: 10/380,702

(22) PCT Filed: Jul. 19, 2001

(86) PCT No.: PCT/IB01/01291
§ 371 (c)(1), (2), (4) Date: Mar. 17, 2003

(87) PCT Pub. No.: WO02/25196
PCT Pub. Date: Mar. 28, 2002

(65) Prior Publication Data
US 2004/0053183 A1 Mar. 18, 2004

(30) Foreign Application Priority Data
Sep. 20, 2000 (DK) .................................. 2000 01390

(51) Int. Cl.$^7$ ............................................. F27B 15/02
(52) U.S. Cl. ............................................. 432/58
(58) Field of Search ................... 432/58, 106; 106/703, 106/709, 713; 110/245, 345

(56) References Cited

U.S. PATENT DOCUMENTS

| | | | |
|---|---|---|---|
| 4,541,245 A | * 9/1985 | Becker et al. | ................. 60/648 |
| 4,747,879 A | 5/1988 | Wolter | |
| 5,365,866 A | * 11/1994 | Von Seebach et al. | ...... 110/345 |
| 5,989,017 A | * 11/1999 | Evans | ......................... 432/14 |

FOREIGN PATENT DOCUMENTS

| | | |
|---|---|---|
| DE | 195 24 649 A1 | 1/1997 |
| EP | 1 004 553 A1 | 10/1999 |

* cited by examiner

*Primary Examiner*—Gregory Wilson
(74) *Attorney, Agent, or Firm*—Jeffrey S. Melcher; Manelli Denison & Selter, PLLC

(57) ABSTRACT

Described is a plant for manufacturing cement clinker comprising a preheater (1) which comprises at least one last cyclone (1d) and at least one next-to-last cyclone (1c) which is connected in series via a gas duct (2c) to and fed with a gas from the last cyclone (1d), a calciner (3) which comprises at least one inlet opening (9) for introducing preheated raw meal from the last cyclone (1d), and which is connected to a subsequent separating cyclone (4), a gas duct (2d) which connects the separating cyclone (4) to the last cyclone (1d), and which comprises at least one inlet opening (11) for introducing preheated raw meal from the next-to-last cyclone (1c). The plant is peculiar in that the inlet opening (11) for introducing preheated raw meal from the next-to-last cyclone (1c) into the gas duct (2d) which connects the separating cyclone (4) to the last cyclone (1d) in a vertical plane is located under at least one inlet opening (9) for introducing preheated raw meal from the last cyclone (1d) into the calciner. Hence, without affecting the installation height of the preheater, it will be possible to locate the last cyclone (1d) of the preheater (1) at an arbitrary height relative to the calciner (3), and preheated raw meal from the last cyclone (1d) can therefore be introduced at any point into the calciner (3) without any use of lifting equipment.

3 Claims, 4 Drawing Sheets

PLANT FOR MANUFACTURING CEMENT CLINKER

Figure 1:
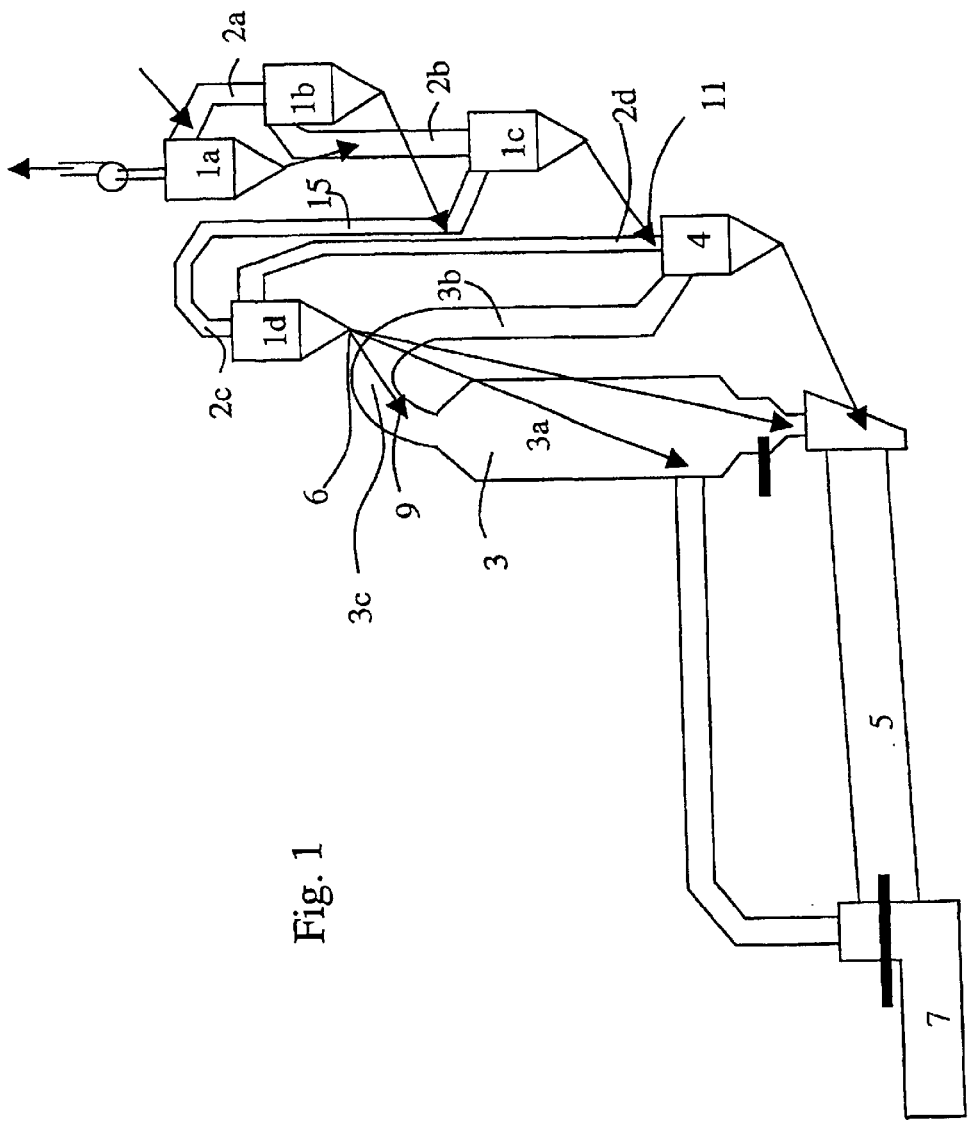

The present invention relates to a plant for manufacturing cement clinker comprising a preheater which comprises at least one last cyclone and at least one next-to-last cyclone which is connected in series via a gas duct to and fed with gas from the last cyclone, a calciner which comprises at least one inlet opening for introducing preheated raw meal from the last cyclone, and which is connected to a subsequent separating cyclone, a gas duct which connects the separating cyclone to the last cyclone, and which comprises at least one inlet opening for introducing preheated raw meal from the next-to-last cyclone.

Plants of the aforementioned kind for manufacturing cement are known for example from DE 19649922 and DE 19524649. In these known plants, raw meal is introduced from a mill plant, typically into the gas inlet duct of the first cyclone of the cyclone preheater and the raw meal is preheated as it is led through the cyclones of the preheater in counterflow to a hot gas flow, typically hot exit gases from the subsequent calciner and/or a subsequent kiln. The preheated raw meal is extracted from the last cyclone of the preheater and introduced into the calciner for calcination therein. The calciners described in the above-mentioned patent specifications comprise a first upward-directed section and a subsequent downward-directed section which is connected to the separating cyclone of the calciner. According to the known plants, the preheated raw meal from the last cyclone of the preheater is introduced into the lower end of the upward-directed section of the calciner and, therefore, the last cyclone of the preheater is located next to the calciner due to the overall installation height of the preheater. In instances where it is desirable to introduce preheated raw meal at a higher intake point of the calciner, such raw meal must therefore be extracted from the next-to-last cyclone of the preheater, which is disadvantageous since, because of the lower temperature in the latter, this may result in poor heat economy and also an excessive reduction of the temperature in the calciner.

It is the objective of the present invention to provide a plant by means of which sufficiently preheated raw meal from the last cyclone of the preheater can be introduced into the upper end of the calciner without causing the installation height of the preheater to be increased.

This is achived by a plant of the kind mentioned in the introduction and being characterized in that the inlet opening for introducing preheated raw meal from the next-to-last cyclone into the gas duct which connects the separating cyclone to the last cyclone in a vertical plane is located under at least one inlet opening for introducing preheated raw meal from the last cyclone into the calciner.

Hence, without affecting the installation height of the preheater, it will be possible to locate the last cyclone of the preheater at an arbitrary height relative to the calciner, and preheated raw meal from the last cyclone can therefore be introduced at any point into the calciner without any use of lifting equipment.

It is preferred that the material outlet from the last cyclone of the preheater in a vertical plane is located above the upper end of the calciner.

In order to limit the installation height of the preheater, it is preferred that the gas duct which connects the last and next-to-last cyclone of the preheater comprises at least one downward-directed duct section.

Figure 2:
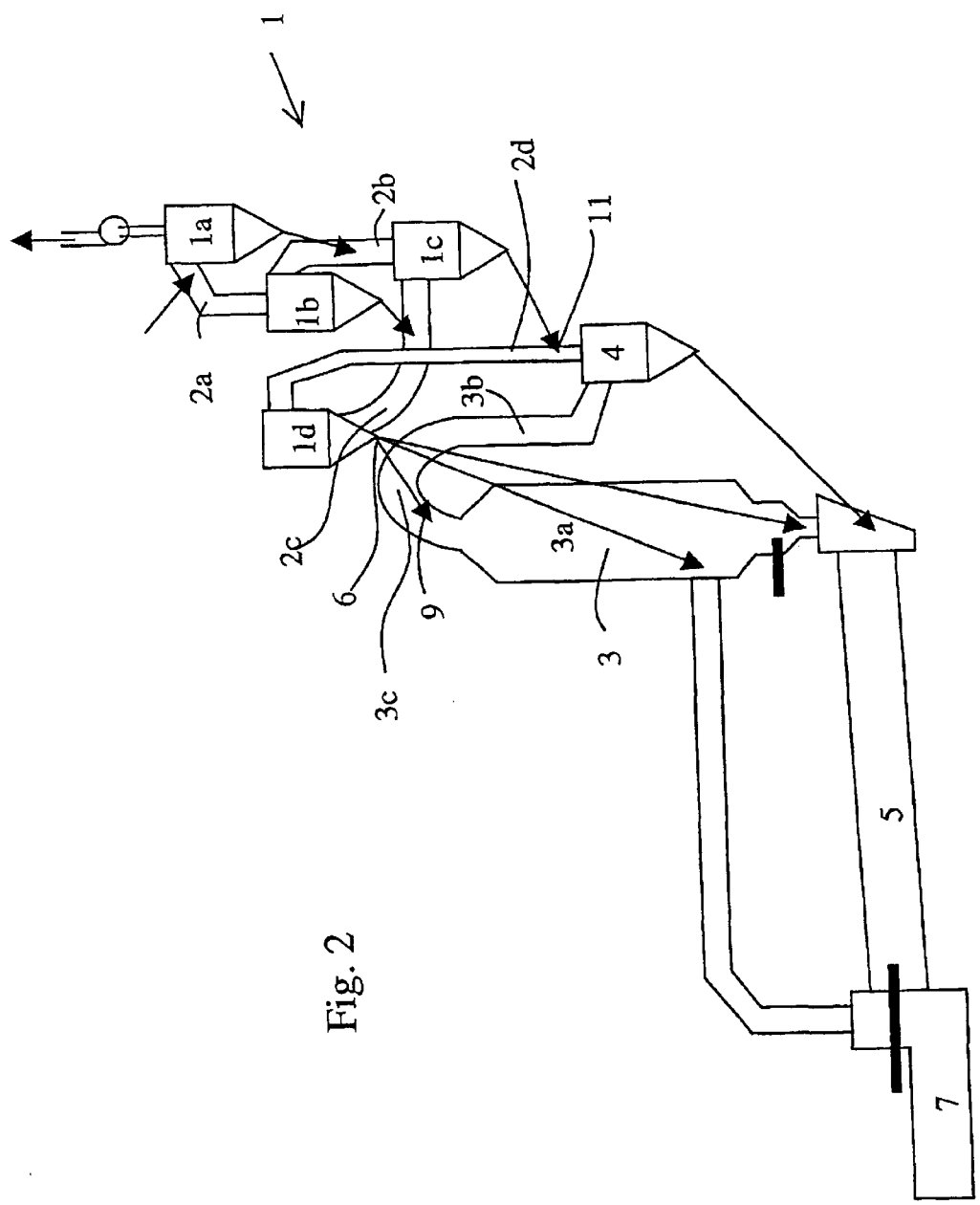
Figure 3:
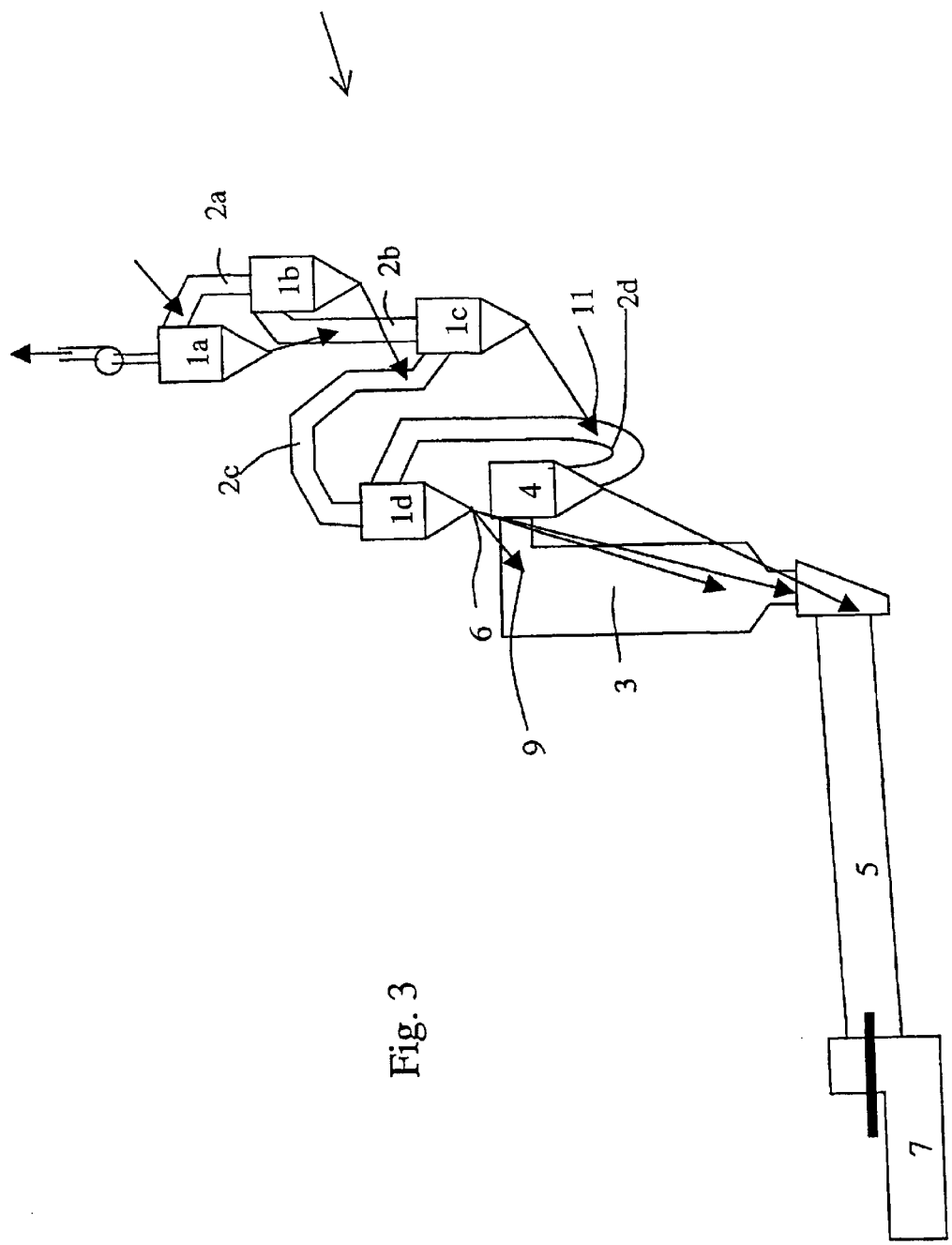
Figure 4:
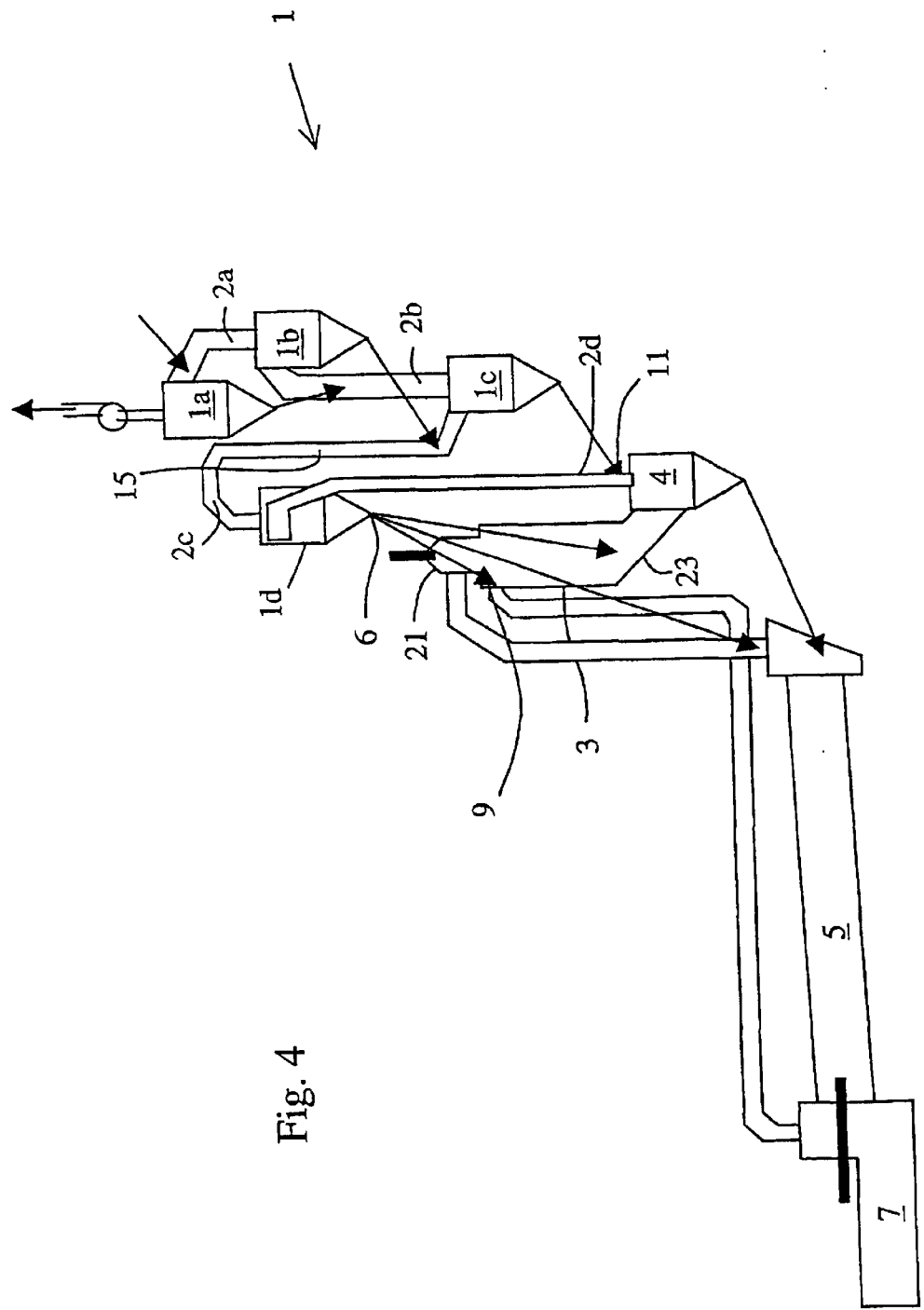

The invention will now be described in further details with reference to drawing where FIG. 1 shows a first embodiment of a plant according to the invention, FIG. 2 shows a second embodiment of a plant according to the invention, FIG. 3 shows a third embodiment of a plant according to the invention, and FIG. 4 shows a fourth embodiment of a plant according to the invention.

FIGS. 1 to 4 show examples of different kiln plants for manufacturing cement clinker. All the shown kiln plants are of the ILC-type, but the invention may also be used in connection with plants of the SLC-type or other plants which are combinations of such plants.

All of the plants comprise a cyclone preheater 1 with four cyclones 1a, 1b, 1c and 1d, where 1a is the first cyclone, 1b is the second cyclone, 1c is the third or next-to-last cyclone and 1d is the fourth or last cyclone. The cyclones are connected in series and fed with gas/raw meal suspension via gas ducts 2a, 2b, 2c and 2d.

The plants also comprise a calciner 3 which comprises at least one inlet opening 9 for introducing preheated raw meal from the last cyclone 1d via its material outlet 6, and being connected to a separating cyclone 4, a rotary kiln 5 and a clinker cooler 7. The gas duct 2d which connects the separating cyclone to the last cyclone, comprises at least one inlet opening 11 for introducing preheated raw meal from the next-to-last cyclone.

According to the invention it is a common feature of all the shown plants that the inlet opening 11 for introducing preheated raw meal from the next-to-last cyclone 1c into the gas duct 2d which connects the separating cyclone 4 to the last cyclone 1d in a vertical plane is located under at least one inlet opening 9 for introducing preheated raw meal from the last cyclone 1d in the calciner 3.

The kiln plants shown in FIGS. 1 and 2 both comprise a calciner 3 which is designed with a so-called swan's neck which in practice means that the calciner comprises a first upward-directed section 3a, which via a 180° bend 3c is connected to a second downward-directed section 3b which in turn is connected to the separating cyclone 4.

In the kiln plant shown in FIG. 1 the cyclone 1d is made up of a conventional cyclone in which the gas/raw meal suspension is introduced tangentially into the upper end of the cyclone and in which the separated raw meal is discharged through the material outlet 6, while the discharge duct 2c for carrying the gas to the cyclone 1c is located at the top of the cyclone 1d. In the shown embodiment the duct 2c comprises a downward-directed section 15 thereby allowing the cyclone 1c in a vertical plane to be located at a lower level, making it possible to reduce the installation height.

In the kiln plant shown in FIG. 2, the cyclone 1d is made up of a cyclone which corresponds to that shown in FIG. 1, except for the fact that the discharge duct 2c for conveying the gas to the cyclone 1c extends through the bottom. This embodiment also makes it possible for the cyclone 1c at a vertical plane to be located at a lower level.

The kiln plant shown in FIG. 3 corresponds to the plant shown in FIG. 1 except for the fact that the calciner 3 is not designed with a swan's neck and that the separating cyclone 4 is designed with a gas discharge duct 2d which extends through the bottom hereof.

The kiln plant shown in FIG. 4 comprises a calciner 3 in which exit gases from the kiln 5 and fuel are introduced into the upper end 21 of the calciner 3 and led down through the calciner 3 as a suspension. Preheated air from the clinker cooler 7 and preheated raw meal from the last cyclone 1d of the preheater 3 is introduced into the calciner 3 at a location further down on the calciner 3, thereby causing the preheated air to be led down through the calciner 3, with the air being gradually mixed with the exit gas/fuel suspension, and with force of gravity causing the raw meal to be led down through the calciner 3 along its wall. In the lower end 23 of the calciner the raw meal is again suspended in the exit gases whereafter the formed exit gas/raw meal suspension is extracted from the lower end 23 of the calciner 3 and directed to the separating cyclone 4. From the separating cyclone 4 the exit gases are passed upward to the cyclone 1*d*, which, in similar manner as the embodiment shown in FIG. 1, is made up of a conventional cyclone in which the exit gas/raw meal suspension is introduced tangentially into the upper end of the cyclone, and in which the separated raw meal is discharged through the material outlet 6, while the discharge duct 2*c* for carrying the gas to the cyclone 1*c* is located at the top of the cyclone 1*d*. The duct 2*c* comprises a downward-directed duct section 15 allowing the cyclone 1*c* in a vertical plane to be located at a low level relative to the upper end of the calciner so that the installation height can be reduced.

The present invention is not limited to the shown embodiments which are illustrative only, thus allowing for many different embodiments and combinations of the shown embodiments which are within the scope the present invention.

What is claimed is:

1. Plant for manufacturing cement clinker comprising a preheater which comprises at least one last cyclone and at least one next-to-last cyclone which is connected in series via a gas duct to and fed with gas from the last cyclone, a calciner which comprises at least one inlet opening for introducing preheated raw meal from the last cyclone, and which is connected to a subsequent separating cyclone, a gas duct which connects the separating cyclone to the last cyclone, and which comprises at least one inlet opening for introducing preheated raw meal from the next-to-last cyclone, wherein the inlet opening for introducing preheated raw meal from the next-to-last cyclone into the gas duct which connects the separating cyclone to the last cyclone in a vertical plane is located under at least one inlet opening for introducing is preheated raw meal from the last cyclone into the calciner.

2. Plant according to claim 1, wherein the material outlet from the last cyclone of the preheater in a vertical plane is located above the upper end of the calciner.

3. Plant according to claim 1, wherein the gas duct which connects the last and next-to-last cyclone of the preheater comprises at least one downward-directed duct section.

* * * * *